United States Patent
Ned et al.

(10) Patent No.: US 10,126,195 B2
(45) Date of Patent: Nov. 13, 2018

(54) HIGH-TEMPERATURE HEADERS WITH RIBBED COMPONENTS FOR STRESS-RELIEVED HERMETIC SEALING

(71) Applicant: KULITE SEMICONDUCTOR PRODUCTS, INC., Leonia, NJ (US)

(72) Inventors: Alexander A. Ned, Kinnelon, NJ (US); Sorin Stefanescu, New Milford, NJ (US)

( * ) Notice: Subject to any disclaimer, the term of this patent is extended or adjusted under 35 U.S.C. 154(b) by 168 days.

(21) Appl. No.: 15/212,998

(22) Filed: Jul. 18, 2016

(65) Prior Publication Data
US 2017/0016788 A1 Jan. 19, 2017

Related U.S. Application Data

(60) Provisional application No. 62/193,480, filed on Jul. 16, 2015.

(51) Int. Cl.
G01L 19/04 (2006.01)
G01L 19/06 (2006.01)
G01L 19/14 (2006.01)

(52) U.S. Cl.
CPC .......... *G01L 19/0681* (2013.01); *G01L 19/04* (2013.01)

(58) Field of Classification Search
CPC ..... G01L 19/04; G01L 19/06; G01L 19/0681; G01L 19/14
See application file for complete search history.

(56) References Cited

U.S. PATENT DOCUMENTS

| 5,625,151 | A | * | 4/1997 | Yamaguchi | G01L 19/04 73/716 |
| 5,955,771 | A | * | 9/1999 | Kurtz | G01L 19/147 257/419 |
| 2009/0108382 | A1 | * | 4/2009 | Eriksen | C23C 14/021 257/419 |
| 2012/0024073 | A1 | * | 2/2012 | Guo | G01L 19/04 73/718 |
| 2017/0016791 | A1 | * | 1/2017 | Ned | G01L 19/0681 |

\* cited by examiner

*Primary Examiner* — Nguyen Ha
(74) *Attorney, Agent, or Firm* — Troutman Sanders LLP; James E. Schutz; Christopher C. Close, Jr.

(57) ABSTRACT

Aspects of the present disclosure relate to a pressure sensor header for use with a pressure-sensing device. The pressure sensor header can be used in high-temperature environments. A pressure sensor header of the present disclosure can include a header shell, a sealing header glass that is sealed to the header shell, one or more electrical connections electrically isolated from the header shell by the sealing header glass, and a plate for sealing to a pressure-sensing device to be incorporated onto the pressure sensor header. The plate may include one or more ribs that allow for sealing of the plate to the header shell. The pressure sensor header may include a ribbed insert for sealing to the header shell and plate.

13 Claims, 8 Drawing Sheets

HIGH-TEMPERATURE HEADERS WITH RIBBED COMPONENTS FOR STRESS-RELIEVED HERMETIC SEALING

RELATED APPLICATIONS

This application claims priority to, and the benefit under 35 U.S.C. § 119(e), of U.S. Provisional Patent No. 62/193,480, filed on 16 Jul. 2015, entitled: "High-Temperature Headers with Ribbed Components for Stress-Relieved Hermetic Sealing," the contents of which are hereby incorporated by reference in their entirety as if presented herein in full.

TECHNICAL FIELD

This disclosure generally relates to pressure sensor headers for pressure sensors that operate in high-temperature and harsh environments.

BACKGROUND

High-temperature headers have applications for packaging electronic devices that either operate in high temperature environments or operate at high temperatures due to high power dissipation during their operation. In particular, high-temperature headers have applications for pressure sensors designed for operation in aircraft engines, power generating turbines, or similar harsh, high-temperature environments. Generally, for pressure sensor operation in such environments, pressure sensor headers should be functional at temperatures between 400° C. and 800° C.

In general, for proper pressure sensor operation, the pressure-sensing chips are mounted or affixed to headers (or high-temperature headers), thus forming a pressure-sensing device or header assembly, that are installed in a system. The headers ensure a functional interface between sensor chip and measured environment. Typical pressure-sensing devices and/or header assemblies are fabricated using materials like silicon, silicon carbide, or other semiconductor materials. Ideally, to ensure a functional interface between the sensor chip and the measured environment, the header would comprise components (e.g., header shell, header glass, electrically conductive pins sealed into the header glass) with matching thermal expansion coefficients. Further, an ideal header's components would have thermal expansion coefficients that match the pressure sensor chip (or other device to be mounted or sealed onto the pressure-sensor device/header assembly). It is common, however, that pressure-sensing applications require pressure transducer installation in systems comprising devices or pressure sensor chips with thermal expansion characteristics that are markedly different from those of the header shell and/or header glass. These challenges become increasingly apparent for pressure sensor operation at increased temperatures. The following disclosure is directed at addressing such challenges.

BRIEF DESCRIPTION OF THE FIGURES

Reference will now be made to the accompanying figures, which are not necessarily drawn to scale, and wherein.

DETAILED DESCRIPTION

Figure 1:
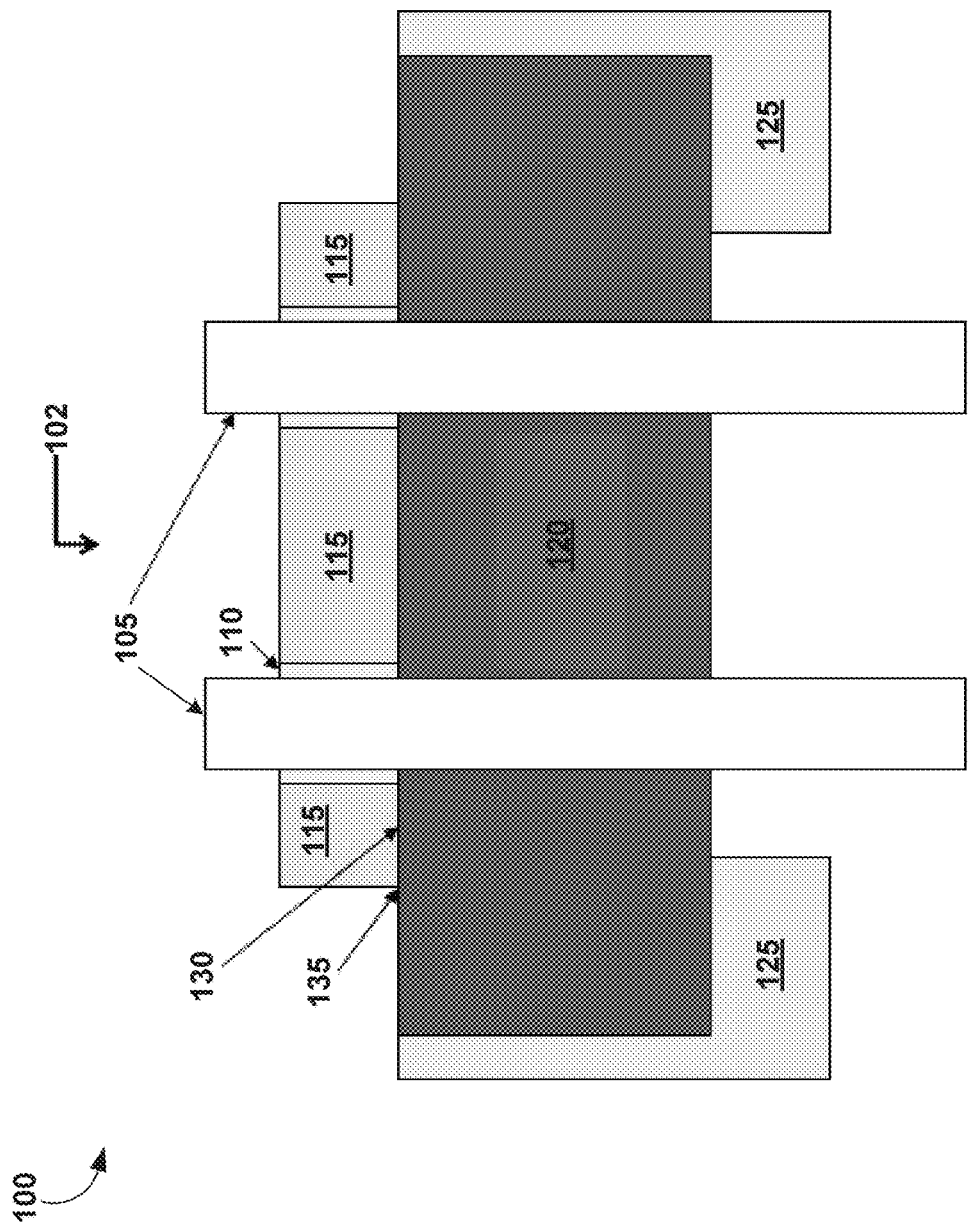
FIG. 1 is a cross-sectional view of a pressure sensor header 100, according to some embodiments.

The following detailed description is merely illustrative in nature and is not intended to limit the present disclosure, or the application and uses of the present disclosure. Furthermore, there is no intention to be bound by any expressed or implied theory presented in the preceding field of use, background, or summary of the disclosure or the following detailed description. The present disclosure provides various examples, embodiments and the like, which may be described herein in terms of functional or logical block elements. Various techniques described herein may be used for pressure sensor headers for pressure sensors that operate in high-temperature and harsh environments. The various aspects described herein are presented as methods, devices (or apparatus), and systems that may include a number of components, elements, members, modules, nodes, peripherals, or the like. Further, these methods, devices, and systems may include or not include additional components, elements, members, modules, nodes, peripherals, or the like.

Throughout the specification and the claims, the following terms take at least the meanings explicitly associated herein, unless the context clearly dictates otherwise. The terms "connect," "connecting," and "connected" mean that one function, feature, structure, or characteristic is directly joined to or in communication with another function, feature, structure, or characteristic. The terms "couple," "coupling," and "coupled" mean that one function, feature, structure, or characteristic is directly or indirectly joined to or in communication with another function, feature, structure, or characteristic. Relational terms such as "first" and "second," and the like may be used solely to distinguish one entity or action from another entity or action without necessarily requiring or implying any actual such relationship or order between such entities or actions. The term "or" is intended to mean an inclusive or. Further, the terms "a," "an," and "the" are intended to mean one or more unless specified otherwise or clear from the context to be directed to a singular form. The term "include" and its various forms are intended to mean including but not limited to. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%.

In the following description, numerous specific details are set forth. But, it is to be understood that embodiments of the disclosed technology may be practiced without these specific details. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may.

Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure.

As discussed above, it is a challenge in fabricating pressure-sensing devices or chips and/or header assemblies because the materials used in constructing the various components may not have similar thermal expansion characteristics. Often, as shown in FIGS. 1 and 2, a pressure sensor header 100 will include a plate 115 to address the challenge of using components and devices or pressure sensor chips with mismatched thermal expansion characteristics.

FIG. 1 is a cross-sectional view of a pressure sensor header 100, which can be a high-temperature pressure sensor header, according to some embodiments. FIG. 2 is a perspective view of the pressure sensor header 100. In FIGS. 1 and 2, the mounting side for the pressure sensor or chip is illustrated by 102. As shown in FIGS. 1 and 2, a header 100 can comprise a header shell 125, which can be made of a nickel-chromium alloy (e.g., Inconel), or a similar material, which has thermal expansion properties that are similar to the piping of the relevant system requiring pressure measurement. The piping may be fabricated from, for instance, steel or stainless-steel-type materials to withstand various levels of pressure, various temperature levels, and potentially chemically aggressive or corrosive fluids. In some embodiments, a header 100 comprises electrical connections 105 to the semiconductor pressure sensor device or chip (not shown), and the electrical connections 105 can be feedthroughs made of platinum or another electrically conductive and temperature-resistant material that is sealed to, and electrically isolated from, the header shell 125 by a sealing header glass 120 (alternatively referred to simply as header glass 120), which can be constructed using a high-temperature glass or ceramic-glass-type material with acceptable thermal expansion match to the materials comprising both the electrical connections 105 and the header shell 125 (e.g., platinum and Inconel, respectively). Put differently, the materials from which the header glass 120, the header shell 125, and the electrical connections 105 can be made from materials having thermal expansion characteristics that are substantially similar.

Figure 2:
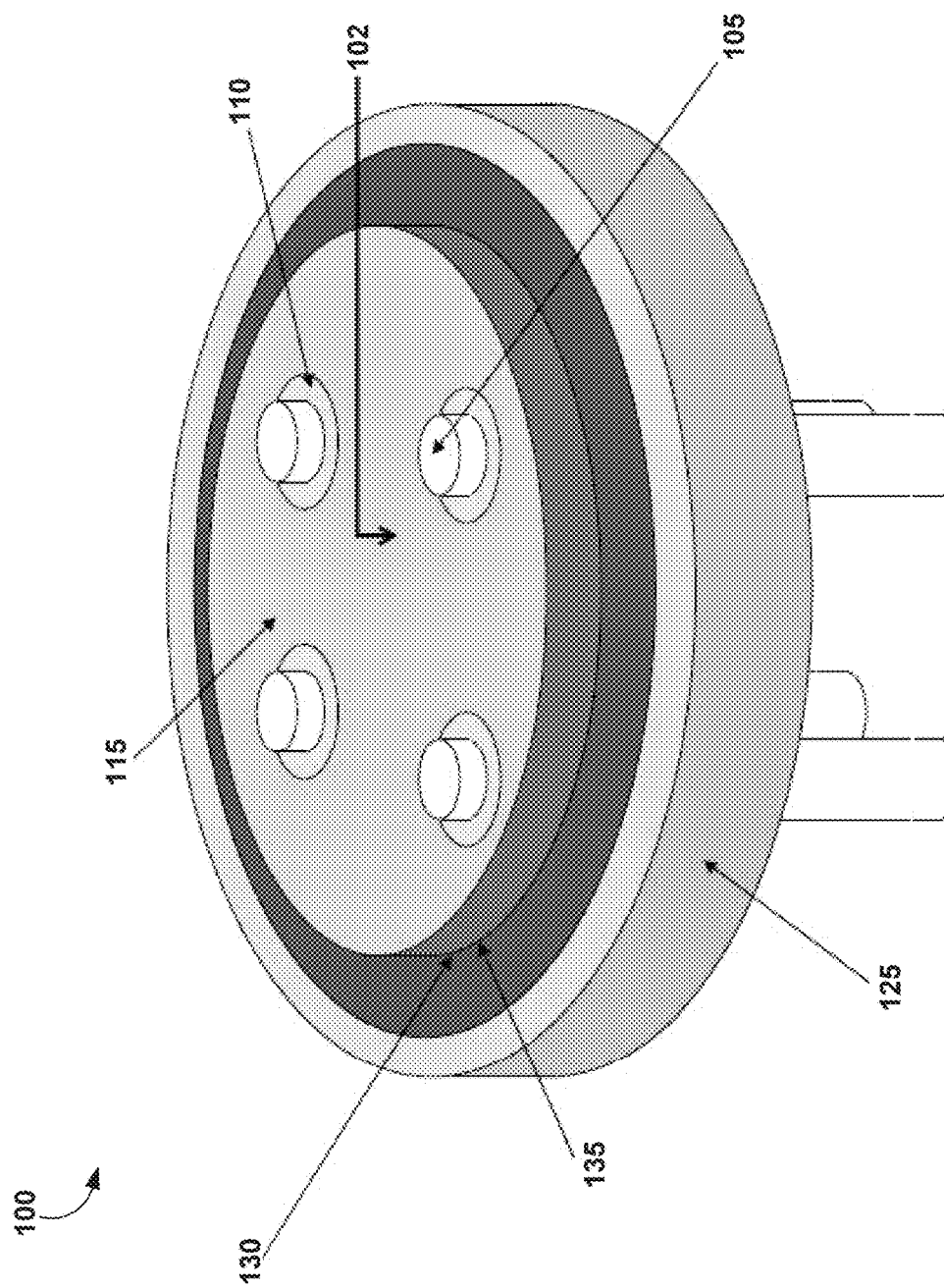
FIG. 2 is a perspective view of the pressure sensor header 100.

In some embodiments, as discussed above, to allow proper mounting and installation of a semiconductor pressure sensing chip made from silicon, silicon carbide, or another suitable high-temperature semiconductor material that has thermal-expansion characteristics that are different from those of that make up the electrical connections 105 and header shell 125, and the sealing header glass 120, it is possible to seal or join a plate 115 to the electrical connections 105 using, for example, a brazing process such as gold brazing (illustrated in FIGS. 1 and 2 by 110). For example, the plate 115 may be made of AlN (aluminum nitride) or another suitable high-temperature material having thermal expansion characteristics that match (or are substantially similar to) those of the semiconductor pressure sensor device or chip that is to be incorporated, mounted, or installed onto the header 100. In such embodiments, the semiconductor pressure sensor chip or device can be mounted or sealed to the plate 115 using glass sealing or another rigid mounting technique. But in such embodiments, the plate 115 typically is left in contact with the header glass 120, but it is not sealed to the header glass 120 (as illustrated by 130 in FIGS. 1 and 2) because the plate 115 does not have thermal expansion characteristics that are similar enough to the header glass 120. Further, as illustrated by 135, the plate 115 is not sealed to the header shell 125. The plate 115 may, however, have thermal expansion characteristics that are similar enough to the header shell 125 to allow for a seal between the plate 115 and the header shell 125, as will be discussed.

As will be understood, after mounting or sealing the pressure sensor device or chip to the plate 115, the portions of the electrical connections 105 (i.e., platinum pins or electrical feedthroughs) protruding from the plate 115 (on the mounting side for the pressure sensor, illustrated as 102) are completely encompassed within the pressure sensor device or chip, and thus can be sealed from the measurement environment. As will be appreciated, this chip sealing and mounting is made possible by the close match between the thermal expansion characteristics of the pressure sensor device or chip and the plate 115. In such a configuration, the plate 115 generally is relatively free to move or slide on the header glass 120, and the plate 115 acts as a stress isolator between the pressure sensor device or chip and the pressure sensor header assembly 100.

As can be appreciated, a pressure sensor fabricated or assembled according to the configuration shown in FIGS. 1 and 2 (i.e., a pressure sensor device in combination with an embodiment of a pressure sensor header assembly 100) would be functional in many environments, but it generally would not function in an electrically conductive environment. The absence of sealing between the plate 115 and the header glass 120 could allow the electrically conductive environment to reach the electrical connections 105 by traveling along the interface between the plate 115 and the header glass 120. This could cause electrical shorting or shunting of the electrical connections 105, which could introduce significant errors in measurements or potentially cause the pressure sensor to become nonfunctional.

Figure 3:
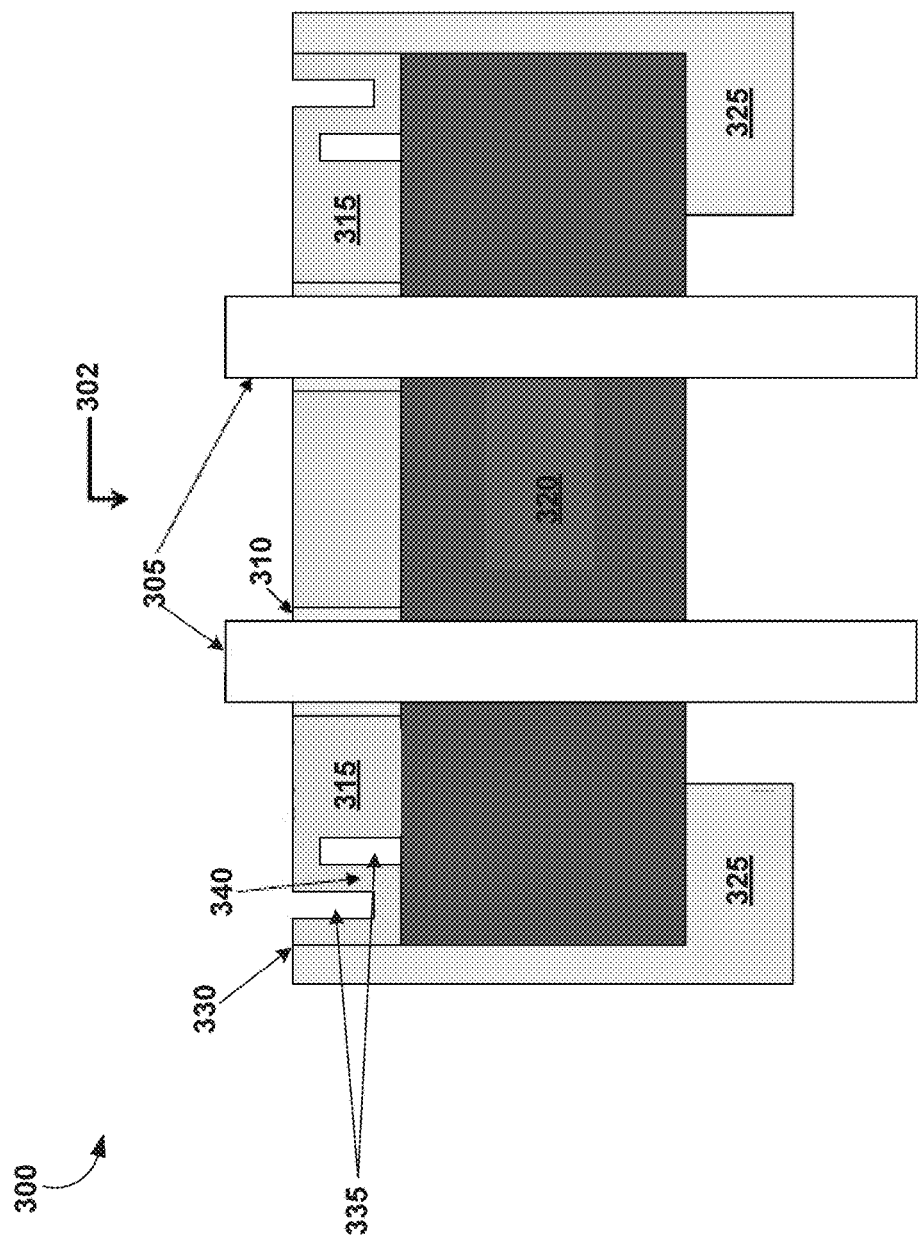
FIG. 3 is a cross-sectional view of an improved pressure sensor header 300, according to some embodiments.
Figure 4:
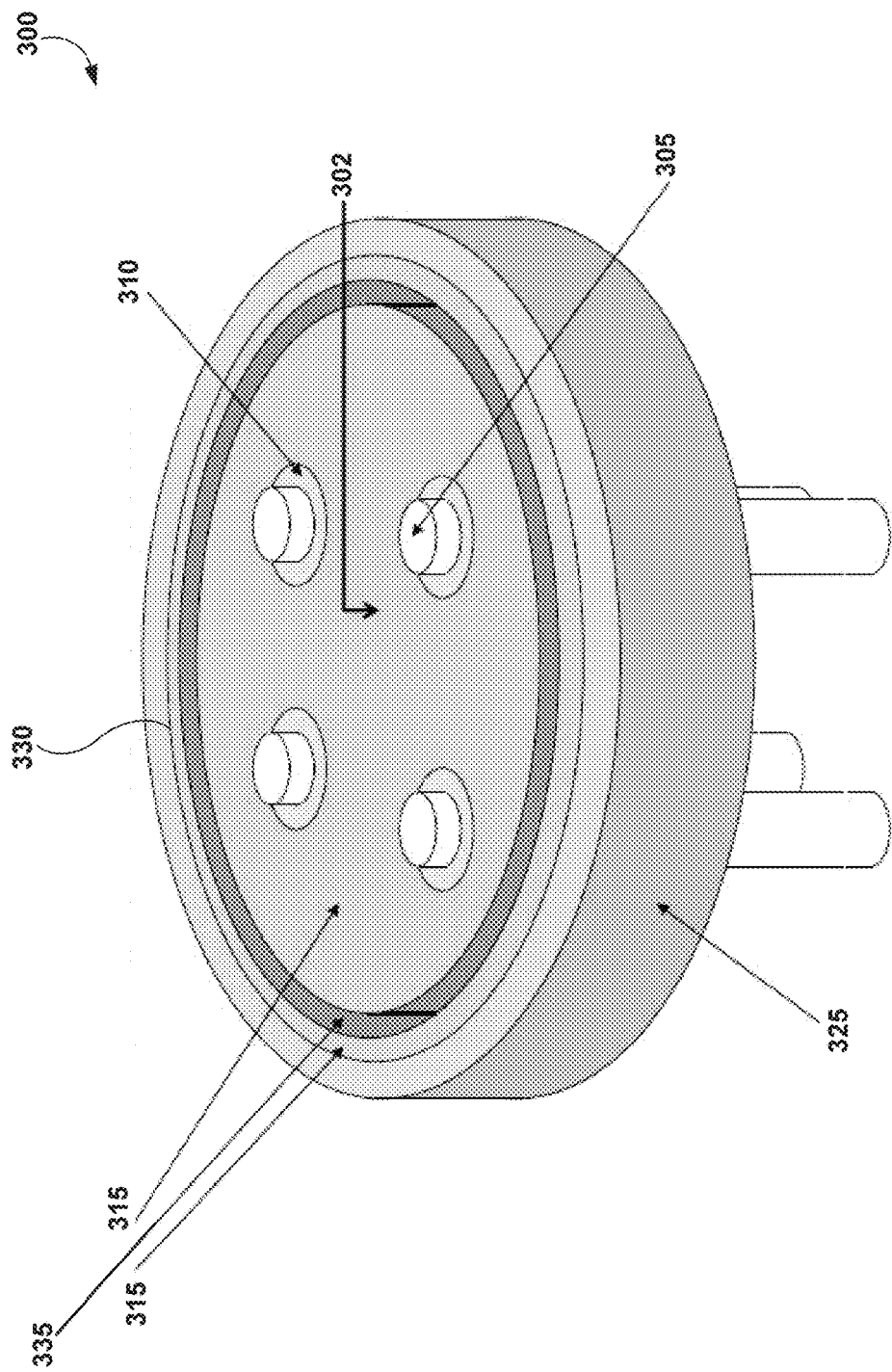
FIG. 4 is a perspective view of the improved pressure sensor header 300, according to some embodiments.

FIG. 3 is a cross-sectional view of an improved pressure sensor header 300, according to some embodiments. FIG. 4 is a perspective view of the improved high-temperature pressure sensor header 300. As will be understood, an improved high-temperature pressure sensor header 300 can comprise features similar to those shown in FIGS. 1 and 2 which are constructed from materials similar to and having properties similar to those described in relation to FIGS. 1 and 2. But as shown in FIGS. 3 and 4, an improved high-temperature pressure sensor header 300 according to the present disclosure can provide electrical isolation of electrical connections 305 from the measurement environment by providing a configuration in which the header shell 325 encloses or fully surrounds the plate 315, which in FIGS. 3 and 4 is shown as a ribbed plate 315. As shown in FIGS. 3 and 4, the header shell 325 may comprise an outer rim that extends vertically above the top surface of the header glass 320.

As shown in FIGS. 3 and 4, electrical isolation between the electrical connections 305 and measurement environment can be achieved by using a ribbed plate 315 (alternatively referred to as an integrated stress-relieving structure). As with the plate 115 shown in FIGS. 1 and 2, a ribbed plate 315 may be made of AlN or another suitable high-temperature material having thermal expansion characteristics that match those of the semiconductor pressure sensor device or chip that is to be incorporated onto the header 300. But the ribbed plate 315 generally does not have thermal expansion characteristics that match as closely the thermal expansion characteristics of the header shell 325. Thus, because there is a mismatch between the thermal expansion characteristics of the header shell 325 and the material comprising the ribbed plate 315, an attempt to seal an unmodified plate (e.g., a plate such as plate 115 as shown in FIGS. 1 and 2, which has no stress-relieving ribbed structure, but does extend out to the header shell 325) to the header shell 325 can lead to cracking or fracturing of the plate due to the stresses that develop because of the thermal expansion mismatch, usually at cooling after the sealing process.

FIGS. 3 and 4 illustrate a design that can overcome this challenge and provide a header assembly 300 that achieves electrical isolation between the electrical connections 305 and measurement environment by sealing the ribbed plate 315 to the header shell 325 (represented by 330). In particular, as shown in FIGS. 3 and 4, the ribbed plate 315 can comprise one or more grooves 335 that provide a degree of flexibility in the ribbed plate 315. As will be appreciated, the grooves 335 can help alleviate the thermal expansion mismatch between the header shell 325 and the ribbed plate 315, which in turn can facilitate sealing (represented by 330) of the ribbed plate 315 to the inner wall of the outer rim of the header shell 325. Further, the grooves 335 can provide stress relief between the ribbed plate 315 and the header glass 320 and the header shell 325, as well as between the device or pressure sensor chip and the header glass 320 and the header shell 325, which can lead to lower measurement error and higher stability in operation. Though shown in FIG. 3 with two grooves 335, it is understood that in some embodiments, one groove 335 may provide the desired degree of flexibility, though in other embodiments, three or more grooves 335 may be desired. In some embodiments, the design of the grooves 335 (i.e., incorporation of a pair of grooves 335) provides a stress-relieving member 340 for horizontal stress that can provide an additional degree of flexibility and assists in alleviating the thermal expansion mismatch between the header shell 325 and the ribbed plate 315. A pressure sensor device or chip can be sealed to the ribbed plate 315 shown in FIGS. 3 and 4 in a manner similar to that described in relation to FIGS. 1 and 2 above.

Figure 5:
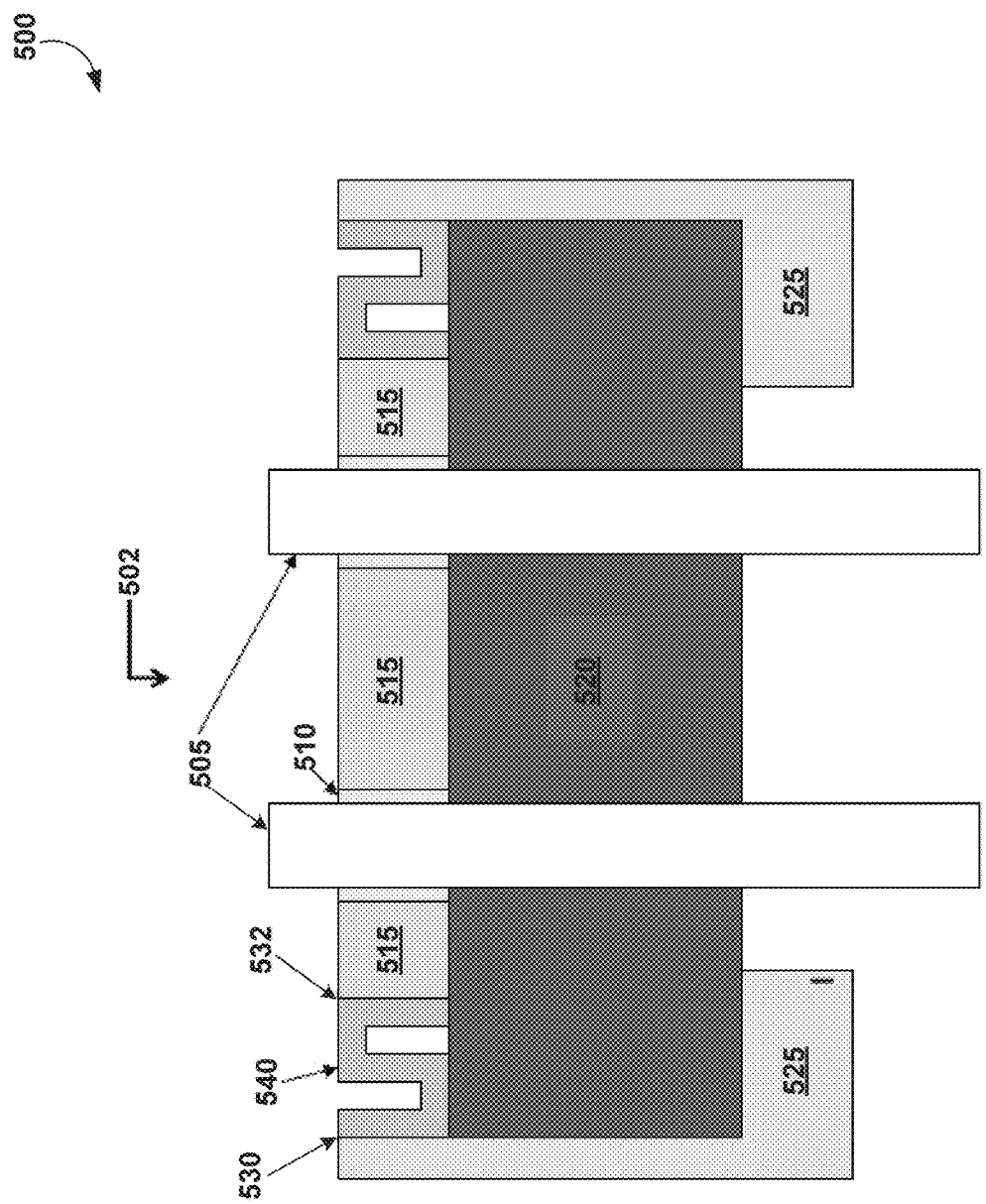
FIG. 5 is a cross-sectional view of an improved pressure sensor header 500, according to some embodiments.
Figure 6:
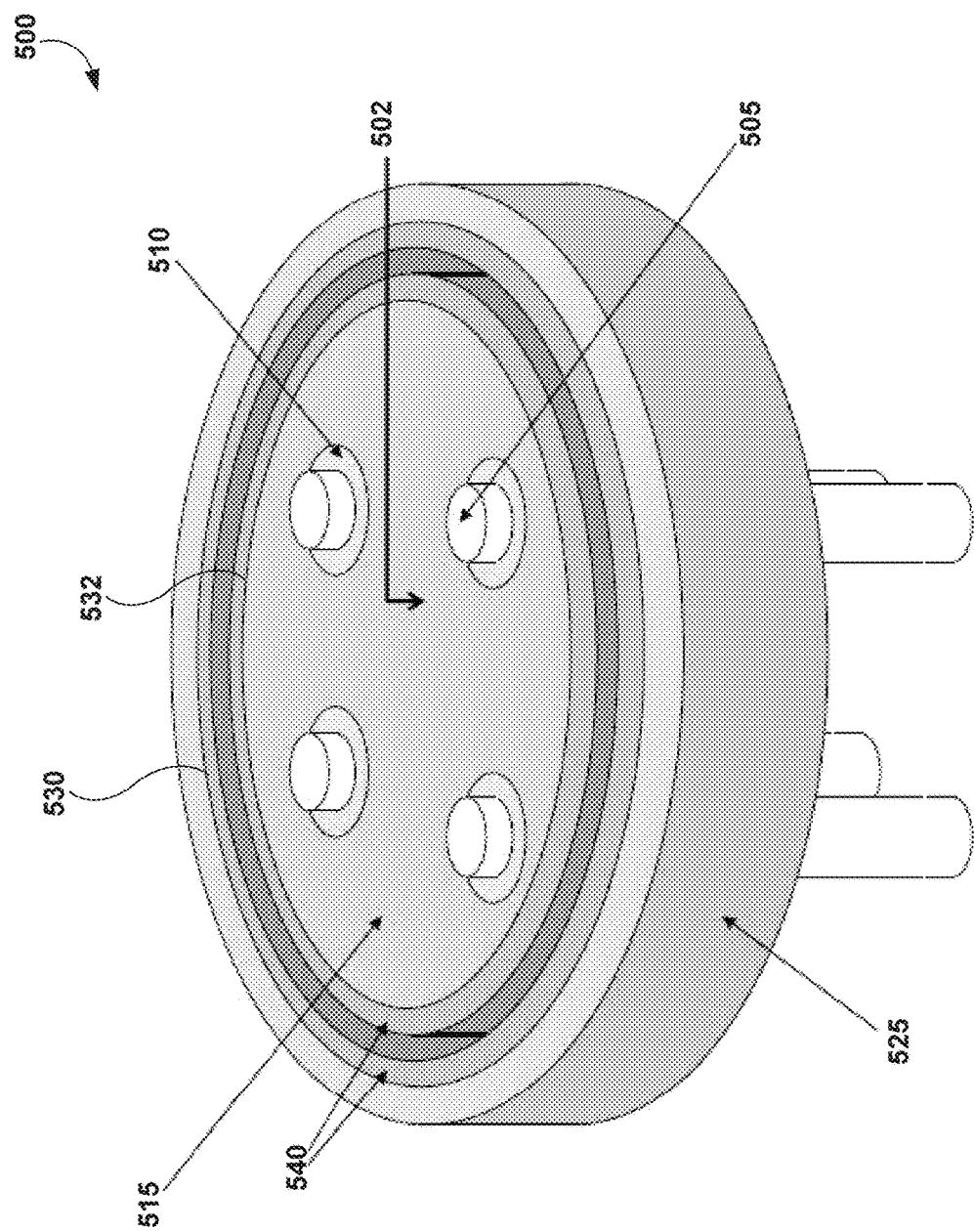
FIG. 6 is a perspective view of the improved pressure sensor header 500, according to some embodiments.

FIG. 5 is a cross-sectional view of an alternate improved pressure sensor header 500, according to some embodiments. FIG. 6 is a perspective view of the alternate improved high-temperature pressure sensor header 500. As will be understood, the improved pressure sensor header 500 can comprise features similar to those shown in FIGS. 3 and 4. As before, a high-temperature pressure sensor header 500 can provide electrical isolation for electrical connections 505 from the measurement environment. As shown in FIGS. 5 and 6, the pressure sensor header 500 can comprise a plate 515 that is similar to the plate 115 shown in FIGS. 1 and 2. The plate 515 is different from the ribbed plate 315 shown in FIGS. 3 and 4 in that the plate 515 does not include integrated stress-relieving grooves (similar to the grooves 335).

In some embodiments, and as shown in FIGS. 5 and 6, a header 500 can include a separate stress-relieving structure (i.e., a ribbed insert) 540 that aids in relieving stress between the components. The ribbed insert 540 can be made from Inconel or from a similar suitable material and can be sealed to both the header shell 525 and to plate 515. As shown in FIGS. 5 and 6, 530 represents the seal between a first side of the ribbed insert 540 and the header shell 525, and 532 represents the seal between a second side of the ribbed insert 540 and the plate 515. The seals 530 and 532 help to prevent the environment from reaching the electrical connections 505 by precluding the environment from traveling along the interface between the plate 515 and the header glass 520. Thus, in a manner similar to the embodiments shown in FIGS. 3 and 4, a pressure sensor device or chip can be sealed to the plate 515.

The provision of a ribbed insert 540 can provide certain manufacturing advantages over use of the ribbed plate 315 shown in FIGS. 3 and 4. In particular, the material from which the ribbed insert 540 is formed (e.g., a metal alloy or nickel-chromium alloy such as Inconel) may be more compliant and/or elastic than the material from which the ribbed plate 315 is formed, which may provide additional stress relief when sealing the ribbed insert 540 to the header shell 525 and plate 515. The additional stress relief can provide higher ease in the manufacturing process, and higher reliability and stability in operation.

Figure 7:
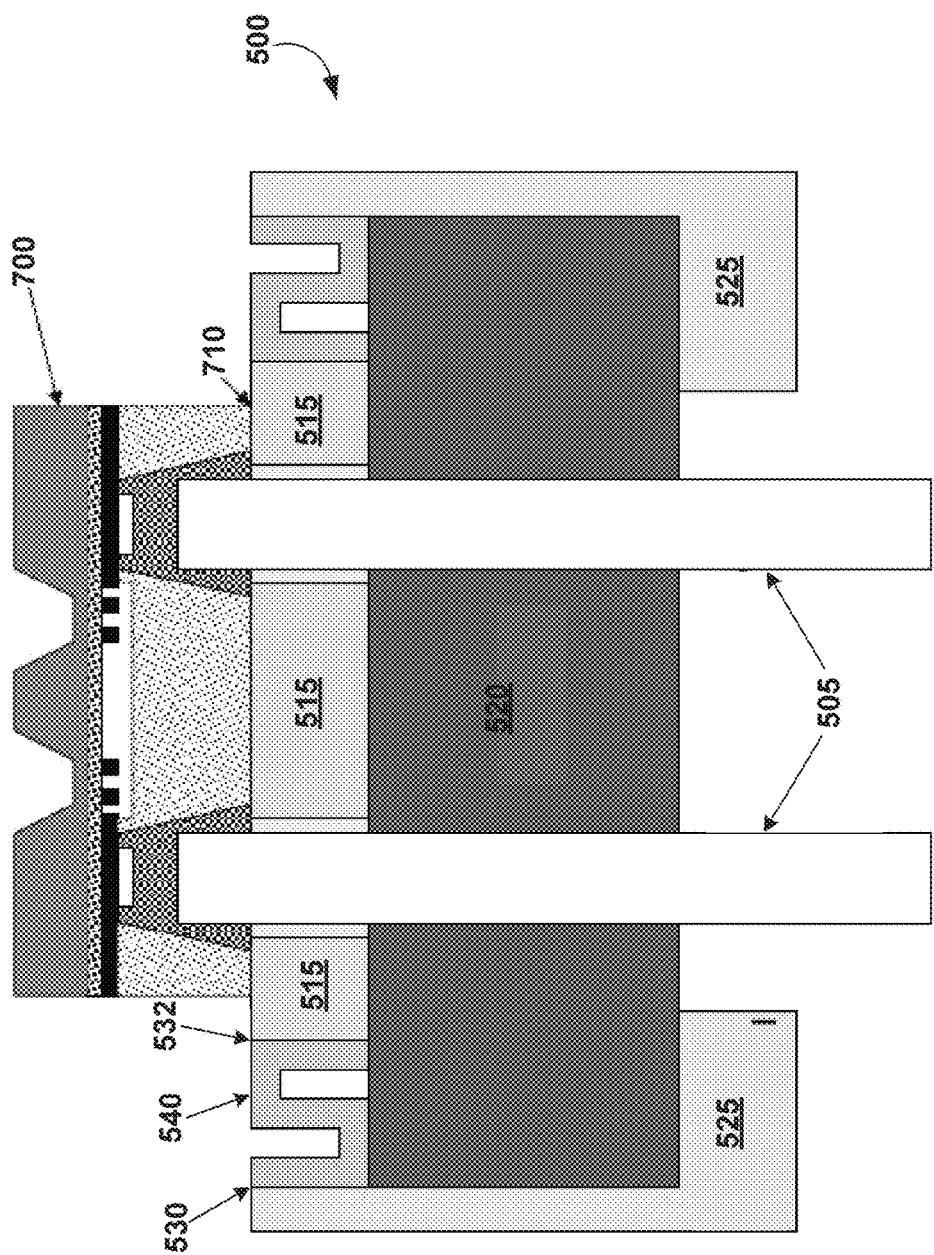
FIG. 7 is a cross-sectional view of an improved pressure sensor header 500 and a pressure sensor 700, according to some embodiments.
Figure 8:
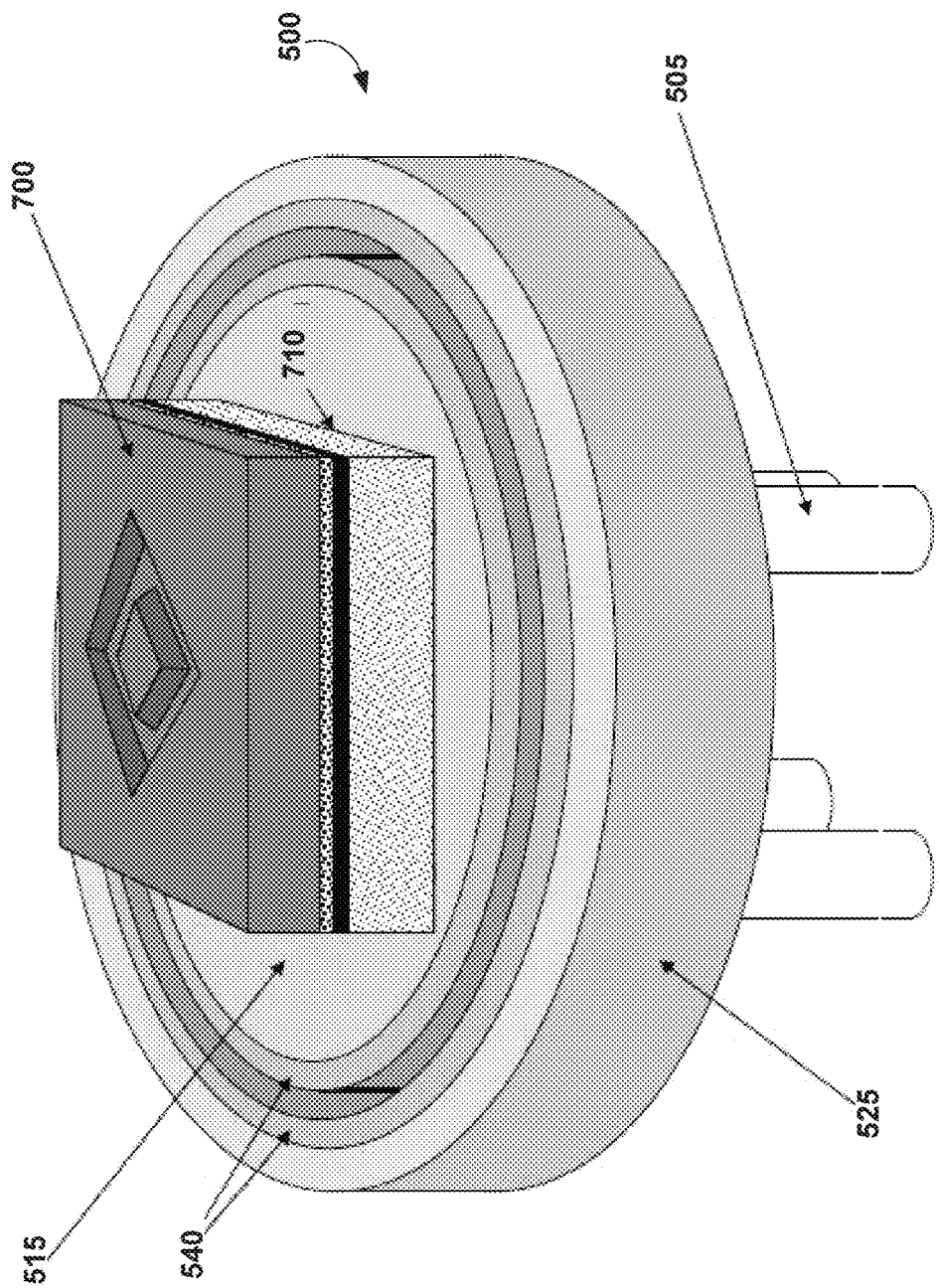
FIG. 8 is a perspective view of the improved pressure sensor header 500 and the pressure sensor 700, according to some embodiments.

FIGS. 7 and 8 show a semiconductor pressure sensor chip or device 700 mounted or sealed to the plate 515 from the improved header design shown in FIGS. 5 and 6. As shown in FIGS. 7 and 8, in some embodiments, a semiconductor pressure sensor chip or device 700 can be mounted or sealed to the plate 515 using glass sealing or another rigid mounting technique (as represented by 710).

As will be appreciated, the seal 710 between the semiconductor pressure sensor 700 and the plate 515, and the seal between the ribbed insert 540 and the plate 515, on the one side, and the header shell 525, on the other, provide complete isolation for the electrical connections 505 from the measurement environment.

It is important to recognize that it is impractical to describe every conceivable combination of components or methodologies for purposes of describing the claimed subject matter. But a person having ordinary skill in the art will recognize that many further combinations and permutations of the subject technology are possible. Accordingly, the claimed subject matter is intended to cover all such alterations, modifications, and variations that are within the spirit and scope of the claimed subject matter.

Although the present disclosure describes specific examples, embodiments, and the like, various modifications and changes may be made without departing from the scope of the present disclosure as set forth in the claims below. For example, the skilled artisan will readily recognize that the example methods, devices or systems may be used in other methods, devices or systems and may be configured to correspond to such other example methods, devices or systems as needed. Further, while at least one example, embodiment, or the like has been presented in the foregoing detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all of the claims. Any benefits, advantages, or solutions to problems that are described herein with regard to specific examples, embodiments, or the like are not intended to be construed as a critical, required, or essential feature or element of any or all of the claims.

The invention claimed is:

1. A pressure sensor header for use with a pressure-sensing device, the pressure sensor header comprising:

a header shell;

a sealing header glass sealed to the header shell;

one or more electrical connections; and a plate for sealing to the pressure-sensing device to be incorporated onto the pressure sensor header, the plate being in contact with, but not sealed to, the header glass.

2. The pressure sensor header of claim 1, wherein the header shell is formed from a nickel-chromium alloy.

3. The pressure sensor of claim 1, wherein the sealing header glass electrically isolates the one or more electrical connections from the header shell.

4. The pressure sensor header of claim 1, wherein the sealing header glass, the header shell, and the one or more electrical connections are formed from materials having substantially similar thermal expansion characteristics.

5. The pressure sensor header of claim 1, wherein the one or more electrical connections is made of platinum.

6. The pressure sensor header of claim 1, the one or more electrical connections extending through the plate and joined to the plate by a brazing process.

7. The pressure sensor header of claim 1, wherein:

the header shell comprises an outer rim extending vertically above a top surface of the header glass, the outer rim comprising an inner wall; and the plate comprises one or more grooves, the plate sealed to the inner wall of the other rim of the header shell.

8. The pressure sensor header of claim 1 further comprising a ribbed insert having a first side and a second side, and wherein:

the header shell comprises an outer rim extending vertically above a top surface of the header glass, the outer rim comprising an inner wall; and the ribbed insert sealed, on the first side, to the inner wall of the outer rim of the header shell and, on the second side, to the plate.

9. The pressure sensor header of claim 8, wherein the header shell and the ribbed insert are formed from a nickel-chromium alloy.

10. A pressure sensor header for use with a pressure-sensing device, the pressure sensor header comprising:

a header shell;

a sealing header glass sealed to the header shell;

one or more electrical connections; and a plate for sealing to the pressure-sensing device to be incorporated onto the pressure sensor header, wherein the plate has thermal expansion characteristics substantially similar to materials of the pressure-sensing device and can be mounted to the pressure-sensing device using rigid mounting techniques, and wherein the plate has thermal expansion characteristics that are not substantially similar to the materials of the header glass, and/or the header, and/or the header assembly.

11. The pressure sensor header of claim 10, the plate being in contact with, but not sealed to, the header glass.

12. A pressure sensor header for use with a pressure-sensing device to be incorporated onto the pressure sensor header, the pressure sensor header comprising:

a sealing header glass having a top surface;

a header shell sealed to the sealing header glass, the header shell comprising an outer rim extending vertically above the top surface of the header glass, the outer rim comprising an inner wall;

a plate for sealing to the pressure-sensing device to be incorporated onto the pressure sensor header, the plate comprising one or more grooves, and the plate sealed to the inner wall of the outer rim of the header shell; and one or more electrical connections, the one or more electrical connections extending through and joined to the plate by a brazing process, and the sealing header glass electrically isolating the one or more electrical connections from the header shell.

13. A pressure sensor header for use with a pressure-sensing device to be incorporated onto the pressure sensor header, the pressure sensor header comprising:

a sealing header glass having a top surface;

a header shell sealed to the sealing header glass, the header shell comprising an outer rim extending vertically above the top surface of the header glass, the outer rim comprising an inner wall;

a plate for sealing to the pressure-sensing device to be incorporated onto the pressure sensor header;

one or more electrical connections, the one or more electrical connections extending through and joined to the plate by a brazing process, and the sealing glass electrically isolating the one or more electrical connections from the header shell; and a ribbed insert having a first side and a second side, the ribbed insert sealed, on the first side, to the inner wall of the outer rim of the header shell and, on the second side, to the plate.

* * * * *